United States Patent
Lin et al.

(10) Patent No.: US 11,194,077 B2
(45) Date of Patent: Dec. 7, 2021

(54) HYDROPHILIC COATING METHOD FOR CONTACT LENS SURFACE

(71) Applicant: Unicon Optical Co., LTD., Hsinchu County (TW)

(72) Inventors: Ji-Yu Lin, Hsinchu County (TW); Hsu-Kuei Hsiao, Hsinchu County (TW); Ting-Hsuan Lin, Hsinchu County (TW)

(73) Assignee: UNICON OPTICAL CO., LTD., Hsinchu County (TW)

( * ) Notice: Subject to any disclaimer, the term of this patent is extended or adjusted under 35 U.S.C. 154(b) by 283 days.

(21) Appl. No.: 16/390,643

(22) Filed: Apr. 22, 2019

(65) Prior Publication Data
US 2020/0081157 A1    Mar. 12, 2020

(30) Foreign Application Priority Data
Sep. 12, 2018   (TW) .................. 107132068

(51) Int. Cl.

| | |
|---|---|
| *B29D 11/00* | (2006.01) |
| *G02B 1/10* | (2015.01) |
| *G02B 1/04* | (2006.01) |
| *C08L 83/04* | (2006.01) |
| *C08F 8/00* | (2006.01) |
| *C09D 129/04* | (2006.01) |
| *C09D 139/06* | (2006.01) |

(Continued)

(52) U.S. Cl.
CPC .......... *G02B 1/10* (2013.01); *B29D 11/00067* (2013.01); *C08F 8/00* (2013.01); *C08F 20/28* (2013.01); *C08L 83/04* (2013.01); *C09D 129/04* (2013.01); *C09D 139/06* (2013.01); *C09D 171/02* (2013.01); *G02B 1/043* (2013.01)

(58) Field of Classification Search
CPC ........... G02B 1/043; G02B 1/10; C08F 20/28; C08L 83/04; B29D 11/00067
See application file for complete search history.

(56) References Cited

U.S. PATENT DOCUMENTS

| | | | | |
|---|---|---|---|---|
| 4,284,749 A | * | 8/1981 | Neefe | ................. C08F 220/14 |
| | | | | 351/159.33 |
| 2007/0242219 A1 | * | 10/2007 | Zanini | ................. G02B 1/043 |
| | | | | 351/159.33 |

(Continued)

FOREIGN PATENT DOCUMENTS

EP           1 296 673 B1      4/2003

*Primary Examiner* — Elizabeth A Burkhart
(74) *Attorney, Agent, or Firm* — Muncy, Geissler, Olds & Lowe, P.C.

(57) ABSTRACT

The present invention provides a hydrophilic coating method for contact lens surface, firstly performing a hydration procedure S1 to form a hydrated polymer from a non-hydrated polymer, then sequentially contacting the hydrated polymer with a first solution and a second solution containing a high molecular compound at a specific temperature between 50° C. and 70° C. to complete a first hydration process S2 and a second hydration process S3. A contact lens 1 obtained according to the above procedures has a contact angle ranging from about 30° to 65°, and proteins and lipids are not easily deposited on a surface of the contact lens 1, thereby providing the user with good comfort when wearing.

9 Claims, 2 Drawing Sheets

(51) Int. Cl.
C09D 171/02 (2006.01)
C08F 20/28 (2006.01)

(56) References Cited

U.S. PATENT DOCUMENTS

| | | | |
|---|---|---|---|
| 2008/0203592 A1* | 8/2008 | Qiu | A61P 31/04 264/2.6 |
| 2017/0008990 A1* | 1/2017 | Ueyama | C08G 77/14 |
| 2017/0165932 A1 | 6/2017 | Qian et al. | |

* cited by examiner

HYDROPHILIC COATING METHOD FOR CONTACT LENS SURFACE

FIELD OF THE INVENTION

The present invention relates to a method for manufacturing a medical device for correcting vision, and more particularly to a hydrophilic coating method for contact lens surface.

BACKGROUND OF THE INVENTION

Contact lens has had many years of development history. At first, scientists had the idea of wearing lenses directly on the eyes, and developed contact lenses made of glass, but not only were they uncomfortable, the oxygen permeability of glass material was low and could easily cause eye diseases. Later, other materials are used successively, from the earliest polymethyl methacrylate (PMMA) material to the modern oxygen permeable material for hard contact lenses (RGP) and polyhydroxyethyl methacrylate (HEMA) material or hydrogel material for soft contact lenses.

Contact lenses do not have the obstruction of traditional eyeglass frame, have no effect on the wearer's appearance, and without the risk of breakage like traditional spectacle lenses. These advantages allow consumers with the need to correct vision to abandon traditional glasses and choose contact lenses.

Optimistic about the prospects of the contact lens market, and also catering for the consumer demand, in addition to the successive development of contact lenses such as corneal magnifying lens, and anti-blue light lens for vision correction, companies in the related field continue to research and develop other contact lenses with additional functions.

For example, European Patent Publication No. EP 1296673 discloses an antimicrobial coating technology which is applied to contact lenses by covalently bonding a plurality of furanones on a substrate, and an interface layer is selectively formed on the substrate, for example, by dip coating, spin coating, spray coating or plasma polymerization, and then allowing the furanones to bond on the interface layer.

Another example of US Patent Publication No. US 2017/0165932 discloses a method for applying a stable coating on a silicone hydrogel contact lenses. Primarily, a polymerizable composition is first introduced into a lens mold and then cured to form a silicone hydrogel contact lens, and the silicone hydrogel contact lens is immersed in an aqueous solution of a polyanionic polymer having carboxyl group and a number average molecular weight of at least 100,000 Daltons for 60 to 240 minutes, and then the silicone hydrogel contact lens is rinsed with a physiological saline solution having a pH 6.5 to 9.5, and the silicone hydrogel contact lens is finally heated at a temperature of 60° C. to 140° C. to form a crosslinked hydrophilic coating.

However, being a medical device, the basic objects of contact lens are to be safe, comfortable, and effective in correcting vision, and therefore, it is necessary to continuously invest in design and manufacturing to develop a contact lens that is closer to ideal.

SUMMARY OF THE INVENTION

A main object of the present invention is to provide a hydrophilic coating method for contact lens surface, by which a contact lens is obtained in a simple manner with excellent hydrophilicity and proteins and lipids are not easily deposited on a surface of the contact lens, to provide a user with excellent comfort when wearing.

In order to achieve the above object, one embodiment of the present invention provides a hydrophilic coating method for contact lens surface, comprising following steps of:

performing a hydration procedure to form a hydrated polymer from a non-hydrated polymer;

performing a first hydration process for contacting the hydrated polymer with a first solution at a first temperature for a first treatment time, and the first solution comprising at least one composition selected from a group consisting of polyvinyl alcohol (PVA), polyvinylpyrrolidone (PVP), polyethylene glycol (PEG) and the combination thereof; and performing a second hydration process for contacting the hydrated polymer with a second solution at a second temperature for a second treatment time, and the second solution comprising at least one composition selected from a group consisting of polyvinyl alcohol, polyvinylpyrrolidone, polyethylene glycols and the combination thereof.

In the above steps, the first temperature and the second temperature are between 50° C. and 70° C. independently.

With the method of the present invention, a contact angle of the contact lens is about 30° to 65° after performing the hydration procedure, the first hydration process and the second hydration process are sequentially performed at a specific temperature between 50° C. and 70° C. Therefore, the contact lens has excellent hydrophilicity and maintains good wettability when wearing. In addition, compared to conventional contact lenses where proteins and lipids are easily deposited on the surface of the contact lens in contact with the eye, which causes blurring of sight, or even allergies caused by protein denaturation. Because the contact lens of the present invention has excellent hydrophilicity, proteins and lipids are not easily deposited on the surface of the contact lens, thereby greatly reducing the possibility of the above-mentioned discomforts brought about by the conventional contact lens, maintaining the clarity when wearing, and providing a user with good comfort when wearing.

DETAILED DESCRIPTION OF THE PREFERRED EMBODIMENTS

The detailed description and technical contents of the present invention will be described hereinafter with the drawings.

The meanings of the terms and naming methods hereinafter are the same as the ordinary meanings understood by those of ordinary skill in the art unless otherwise defined or specified. In addition, the "a", "an" or "one" described in this specification is not limited to the singular and comprises the plural form.

The definition of "about" in the specification covers a range of plus or minus 10% of the value. For example, "about 60° C." covers the range of 54° C., 55° C., 56° C., 57° C., 58° C., 59° C., 60° C., 61° C., 62° C., 63° C., 64° C., 65° C. and 66° C., that is, between 54° C. and 66° C.

Furthermore, "polymer" used herein refers to a material formed by polymerization or crosslinking of a plurality of monomers, and "molecular weight" is defined as the number-average molecular weight of a polymer material.

Figure 1:
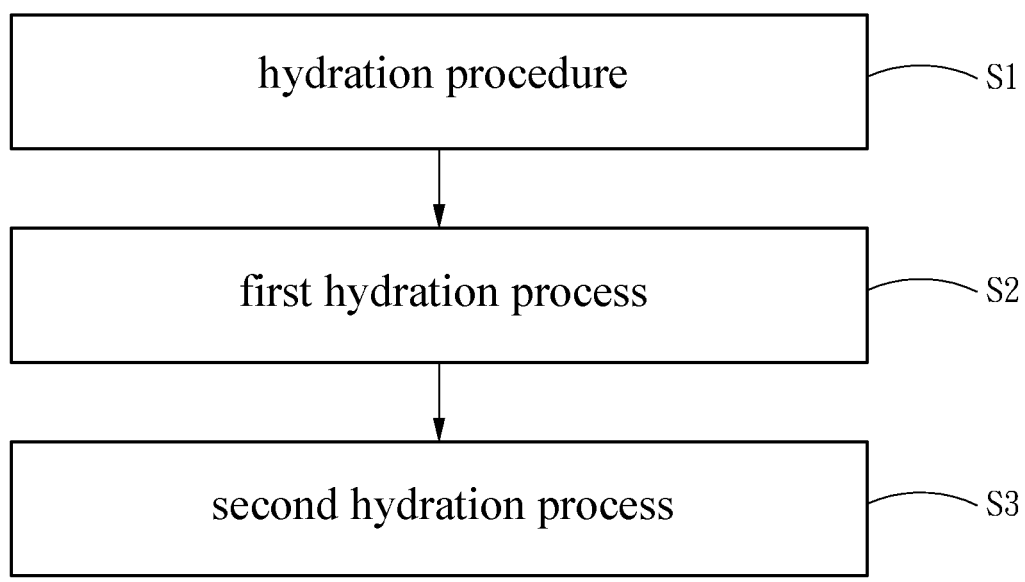
FIG. 1 is a flow chart of a hydrophilic coating method for contact lens surface according to one embodiment of the present invention.

A hydrophilic coating method for contact lens surface of the present invention is described in conjunction with FIG. 1. In step S1, a non-hydrated polymer is first taken, the non-hydrated polymer is a 2-hydroxyethyl methacrylate (HEMA) and a silicone material, the non-hydrated polymer is contacted with pure water for performing a hydration procedure S1 to form the non-hydrated polymer into an aqueous hydrated polymer, and the hydration procedure S1 is carried out at a temperature about 50° C. to 70° C. for about 30 minutes to 50 minutes. For example, the hydration procedure S1 is carried out at a temperature about 60° C. for 40 minutes or at a temperature about 65° C. for 35 minutes.

In step S2, a first hydration process S2 is performed to contact the hydrated polymer with a first solution at a first temperature between 50° C. and 70° C. for a first treatment time. In this embodiment, the first solution is an aqueous solution comprising polyvinyl alcohol (PVA), and a content of the polyvinyl alcohol accounts for 0.01% to 5% by weight of the first solution. The polyvinyl alcohol in the present invention has a molecular weight of about 10,000 to 2,000,000. However, a weight percentage and the molecular weight of polyvinyl alcohol are selected according to requirements in practical use, and the present invention is not particularly limited thereto.

In step S3, a second hydration process S3 is performed to contact the hydrated polymer with a second solution at a second temperature for a second treatment time.

In this embodiment, the second solution is an aqueous solution comprising polyvinylpyrrolidone (PVP) and polyethylene glycol (PEG). In this embodiment, a ratio of polyvinylpyrrolidone to polyethylene glycol in the second solution is between 1:100 and 30:1 based on a weight percentage. Specifically, for example, the second solution comprises 0.05% to 3% polyvinylpyrrolidone by weight of the second solution and 0.1% to 5% polyethylene glycol by weight of the second solution. However, the above weight percents are only an example, other weight percents are used as long as a ratio of polyvinylpyrrolidone to polyethylene glycol in the second solution is between 1:100 and 30:1 based on the weight percentage.

Polyvinylpyrrolidone in the present invention has a molecular weight of about 10,000 to about 2,000,000, and in one preferred embodiment, the molecular weight of polyvinylpyrrolidone is between about 10,000 and about 15,000. As for polyethylene glycol, a molecular weight of polyethylene glycol is between about 1000 and about 10,000, and in one preferred embodiment, the molecular weight of polyethylene glycol is between about 1000 and about 4,000.

The "contact" described in this embodiment is that the hydrated polymer is immersed in the first solution and/or the second solution with an operating temperature at about 50° C. to 70° C., more preferably between about 55° C. and 65° C., and most preferably about 60° C. In addition, the first treatment time and/or the second treatment time in this embodiment are between 10 minutes and 120 minutes independently. For example, the "contact" is able to be carried out at a temperature about 55° C. for 50 minutes, or at a temperature about 60° C. for 40 minutes, and is able to be adjusted within limits defined by the present invention according to actual conditions. In one preferred embodiment, surfaces of the non-hydrated polymer are treated with a surface treatment procedure by using an alcoholic solution prior to performing the hydration procedure S1 as described above. The alcoholic solution is preferably a volatile solution. For example, the alcoholic solution is an aqueous solution comprising ethanol in an amount from 0.1% to 50% by weight of the aqueous solution. In this embodiment, the surface treatment procedure is carried out at a temperature about 20° C. to 50° C. for about 10 to 40 minutes. For example, the surface treatment procedure is carried out at a temperature about 35° C. for 40 minutes or at a temperature about 40° C. for 30 minutes.

Furthermore, in the above embodiment, the hydrated polymer is firstly treated with the first solution comprising polyvinyl alcohol, and then treated with the second solution comprising polyvinylpyrrolidone and polyethylene glycol. In other embodiments, aforesaid treatment steps is able to be reversed, that is, the hydrated polymer is firstly treated with the first solution comprising polyvinylpyrrolidone and polyethylene glycol, and then treated with the second solution comprising polyvinyl alcohol. Except for difference in the treatment steps, the treatment temperature, the treatment time, and the contents of polyvinyl alcohol, polyvinylpyrrolidone, and polyethylene glycol are the same as those described above, and thus will not be described repeatedly herein.

After the second hydration process S3, the hydrated polymer is treated with a balancing procedure, which further contacts the hydrated polymer with a balanced solution comprising sodium carbonate. A pH of the balanced solution is between about pH 7 and pH 8 such as pH 7.3, pH 7.4, or pH 7.5, etc. and an osmotic pressure of the balanced solution is between 300 mmHg and 320 mmHg, more preferably between 305 mmHg and 315 mmHg. The balanced solution further includes at least one composition selected from sodium chloride, disodium hydrogen phosphate, and sodium dihydrogen phosphate in addition to sodium carbonate. The balancing procedure is carried out at a temperature about 15° C. to 35° C. for a third treatment time about 60 to 180 minutes, but the above temperature and the third treatment time are able to be adjusted according to the actual conditions, as long as the third treatment time of the balancing procedure is greater than the first treatment time of the first hydration process S2 and the second treatment time of the second hydration process S3.

Between the second hydration process S3 and the balancing procedure, a rinsing procedure is also selectively added to carry away the solvent remaining on the hydrated polymer. The rinsing procedure, for example, is carried out by immersing the hydrated polymer in pure water for 30 minutes to 50 minutes at an operating temperature between about 50° C. and 70° C., preferably between about 55° C. and 65° C., and more preferably about 60° C.

Figure 2:
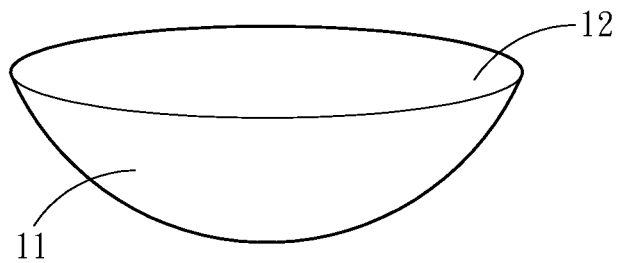
FIG. 2 is a perspective view of a contact lens according to one embodiment of the present invention.
Figure 3:
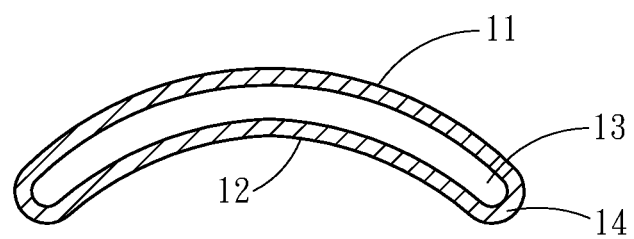
FIG. 3 is a structural view of the contact lens according to one embodiment of the present invention.

After the above steps, the hydrated polymer is sterilized by a method such as autoclaving and packaged to become a contact lens 1. In one embodiment of the present invention, the contact lens 1 includes an outer surface 11 contacting the outside environment and an inner surface 12 contacting an eye shown in FIG. 2 and FIG. 3.

The contact lens 1 further comprises a core structure 13 and a coating 14. The coating 14 is covalently connected to at least a portion of the core structure 13 to be coated on the inner surface 12 of the contact lens 1 for contacting a surface of the eye. A wettability of the contact lens 1 is improved by the coating 14, wherein the coating 14 comprises polyvinyl alcohol, polyvinylpyrrolidone, and polyethylene glycol.

A contact angle of the contact lens 1 is measured by specific examples hereinafter. The contact angle is an important index to measure the hydrophilicity and hydrophobicity of a material of the contact lens 1. The contact angle is generally defined as an included angle between a solid surface and a liquid surface. A captive bubble method is used for measuring herein, however, the captive bubble method is one of the commonly used contact angle measuring methods in the art, and thus will not be described herein.

Test Example 1

In Test example 1, a sample 1 is treated for the core structure 13 according to the above procedures. A composition of the sample 1 comprises 2-hydroxy-2-methylpropiophenone, polydimethylsiloxane (PDMS), N-vinylpyrrolidone (NVP), N,N-dimethylacrylamide (DMAA), ethylene glycol dimethacrylate (EGDMA), 2-hydroxy-2-methyl-1-phenyl-propan-1-one, and toner.

In a comparative example 1, a comparative example 2, and an embodiment 1 of Test example 1, the first solution comprises polyvinyl alcohol in an amount from 0.05% by weight of the first solution, and the second solution comprises polyvinylpyrrolidone in an amount from 0.05% by weight of the second solution and polyethylene glycol in an amount from 0.1% by weight of the second solution.

In the comparative example 1, the first temperature is 40° C. and the second temperature is 40° C.; in the comparative example 2, the first temperature is 60° C. and the second temperature is 40° C.; and in the embodiment 1, the first temperature is 60° C. and the second temperature is 60° C. The measured contact angles are shown in Table 1 below.

TABLE 1

| Group | | First temperature | Second temperature | Contact angle (degree) |
| --- | --- | --- | --- | --- |
| Sample 1 | Comparative example 1 | 40° C. | 40° C. | 90.2~102.1 |
| | Comparative example 2 | 60° C. | 40° C. | 73.5~85.0 |
| | Embodiment 1 | 60° C. | 60° C. | 50.5~65.2 |

Test Example 2

In Test example 2, a sample 2 is treated for the core structure 13 according to the above procedures. A composition of the sample 2 is approximately the same as that of the sample 1 described above, with a difference that a water content of the sample 2 is reduced by 10% compared to the sample 1, which is 43%. In a comparative example 3, a comparative example 4, and an embodiment 2 of this test example, the first solution comprises polyvinyl alcohol in an amount from 3% by weight of the first solution, and the second solution comprises polyvinylpyrrolidone in an amount from 3% by weight of the second solution and polyethylene glycol in an amount from 5% by weight of the second solution.

In the comparative example 3, the first temperature is 40° C. and the second temperature is 40° C.; in the comparative example 4, the first temperature is 60° C. and the second temperature is 40° C.; and in the embodiment 2, the first temperature is 60° C. and the second temperature is 60° C. The measured contact angles are shown in Table 2 below.

TABLE 2

| Group | | First temperature | Second temperature | Contact angle (degree) |
| --- | --- | --- | --- | --- |
| Sample 2 | Comparative example 3 | 40° C. | 40° C. | 80.4~92.1 |
| | Comparative example 4 | 60° C. | 40° C. | 73.5~81.5 |
| | Embodiment 2 | 60° C. | 60° C. | 32.7~43.2 |

Test Example 3

In Test example 3, the sample 1 is treated for the core structure 13 according to the above procedures. In a comparative example 5, a comparative example 6, and an embodiment 3 of Test example 3, the first solution comprises polyvinyl alcohol in an amount from 0.05% by weight of the first solution, and the second solution comprises polyvinylpyrrolidone in an amount from 0.05% by weight of the second solution and polyethylene glycol in an amount from 0.1% by weight of the second solution.

In the comparative example 5, the first temperature is 40° C. and the second temperature is 40° C.; in the comparative example 6, the first temperature is 60° C. and the second temperature is 40° C.; and in the embodiment 3, the first temperature is 60° C. and the second temperature is 60° C. The measured contact angles are shown in Table 3 below.

TABLE 3

| Group | | First temperature | Second temperature | Contact angle (degree) |
| --- | --- | --- | --- | --- |
| Sample 1 | Comparative example 5 | 40° C. | 40° C. | 82.8~92.1 |
| | Comparative example 6 | 60° C. | 40° C. | 68.5~71.4 |
| | Embodiment 3 | 60° C. | 60° C. | 45.5~56.6 |

Test Example 4

In Test example 4, the sample 1 is treated for the core structure 13 according to the above procedures. In a comparative example 7, a comparative example 8, and an embodiment 4 of Test example 4, the first solution comprises polyvinyl alcohol in an amount from 3% by weight of the first solution, and the second solution comprises polyvinylpyrrolidone in an amount from 3% by weight of the second solution and polyethylene glycol in an amount from 5% by weight of the second solution.

In the comparative example 7, the first temperature is 40° C. and the second temperature is 40° C.; in the comparative example 8, the first temperature is 60° C. and the second temperature is 40° C.; and in the embodiment 4, the first temperature is 60° C. and the second temperature is 60° C. The measured contact angles are shown in Table 4 below.

TABLE 4

| Group | | First temperature | Second temperature | Contact angle (degree) |
| --- | --- | --- | --- | --- |
| Sample 1 | Comparative example 7 | 40° C. | 40° C. | 71.1~80.4 |
| | Comparative example 8 | 60° C. | 40° C. | 63.1~70.2 |
| | Embodiment 4 | 60° C. | 60° C. | 33.7~38.2 |

A size of the contact angle is related to the hydrophobicity of the surface of the contact lens 1. When the contact angle between the contact lens 1 and water droplet is larger, the hydrophobicity is higher; conversely, the smaller the contact angle between the contact lens 1 and water droplet, the higher the hydrophilicity. It is observed from Tables 1, 2, 3, and 4 that the contact angles measured in the comparative example 1, 2, 3, 4, 5, 6, 7, and 8 where the first temperature and the second temperature are not within the range defined by the present invention, are larger than the contact angles measured in the embodiments 1, 2, 3 and 4. That is, the comparative example 1, 2, 3, 4, 5, 6, 7, and 8 have higher hydrophobicity than the embodiments 1, 2, 3, therefore, the comfort for wearing the contact lens 1 of the comparative example 1, 2, 3, 4, 5, 6, 7, and 8 is lower than the embodiments 1, 2, 3 and 4 of the present invention.

What is claimed is:

1. A hydrophilic coating method for contact lens surface, comprising following steps of:
    performing a hydration procedure S1 to form a hydrated polymer from a non-hydrated polymer;
    performing a first hydration process S2 for contacting the hydrated polymer with a first solution at a first temperature for a first treatment time, the first solution comprising at least one composition selected from a group consisting of polyvinyl alcohol (PVA), polyvinylpyrrolidone (PVP), polyethylene glycol (PEG) and the combination thereof; and
    performing a second hydration process S3 for contacting the hydrated polymer with a second solution at a second temperature for a second treatment time, the second solution comprising at least one composition selected from a group consisting of polyvinyl alcohol, polyvinylpyrrolidone, polyethylene glycols and the combination thereof;
    wherein the first temperature and the second temperature are between 55° C. and 65° C. independently.

2. The hydrophilic coating method for contact lens surface of claim 1, wherein each of the first solution and the second solution is an aqueous solution comprising polyvinylpyrrolidone and polyethylene glycol, a ratio of polyvinylpyrrolidone to polyethylene glycol in each of the first solution and the second solution is between 1:100 and 30:1 based on a weight percentage.

3. The hydrophilic coating method for contact lens surface of claim 1, wherein the first solution is an aqueous solution comprising polyvinyl alcohol in an amount from 0.01% to 5% by weight of the first solution, and the second solution is an aqueous solution comprising polyvinylpyrrolidone in an amount from 0.05% to 3% by weight of the second solution and polyethylene glycol in an amount from 0.1% to 5% by weight of the second solution.

4. The hydrophilic coating method for contact lens surface of claim 1, wherein the first solution is an aqueous solution comprising polyvinylpyrrolidone in an amount from 0.05% to 3% by weight of the first solution and polyethylene glycol in an amount from 0.1% to 5% by weight of the first solution, and the second solution is an aqueous solution comprising polyvinyl alcohol in an amount from 0.01% to 5% by weight of the second solution.

5. The hydrophilic coating method for contact lens surface of claim 1, wherein the hydration procedure S1 is carried out at a temperature between 50° C. and 70° C.

6. The hydrophilic coating method for contact lens surface of claim 1, wherein the first treatment time and the second treatment time are between 10 minutes and 120 minutes independently.

7. The hydrophilic coating method for contact lens surface of claim 1, wherein before performing the hydration procedure S1, the hydrophilic coating method further comprises a step of performing a surface treatment procedure for treating surfaces of the non-hydrated polymer by using an alcoholic solution.

8. The hydrophilic coating method for contact lens surface of claim 1, wherein after performing the second hydration process S3, the hydrophilic coating method further comprises a balancing procedure for contacting the hydrated polymer with a balanced solution which comprises sodium carbonate for a third treatment time, wherein the third treatment time is greater than the first treatment time or the second treatment time.

9. The hydrophilic coating method for contact lens surface of claim 1, wherein the contact lens 1 are made of a 2-hydroxyethyl methacrylate (HEMA) or a silicone.

\* \* \* \* \*